July 8, 1924.
A. E. VOSBURG ET AL
BORING BAR AND THE LIKE
Filed Feb. 6, 1922
1,500,691
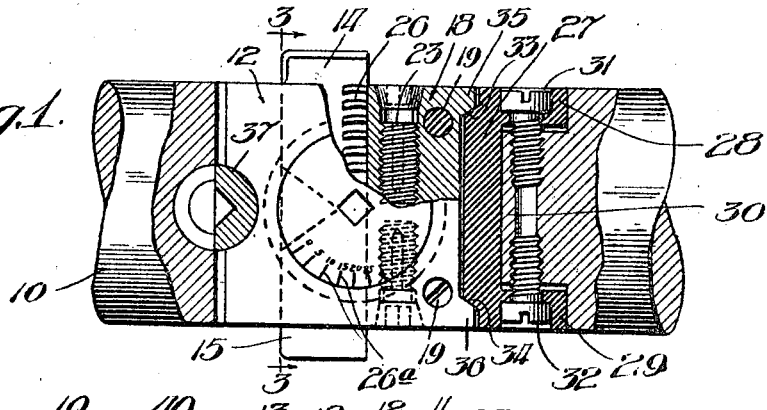
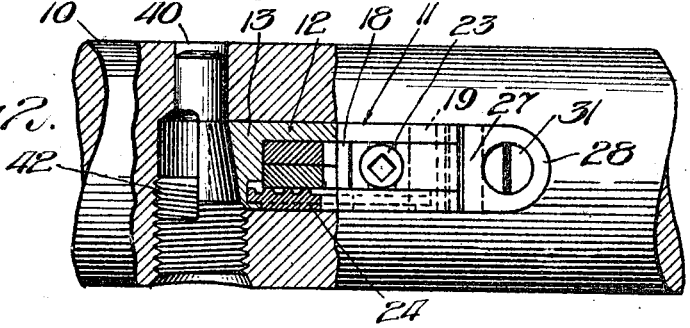
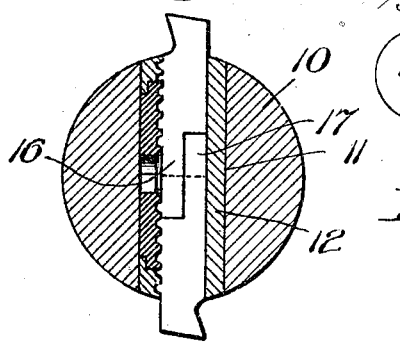
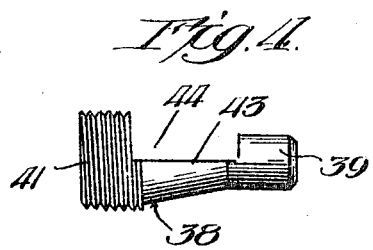
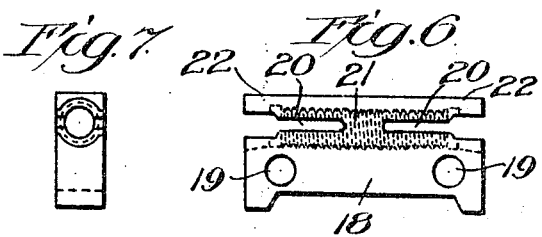
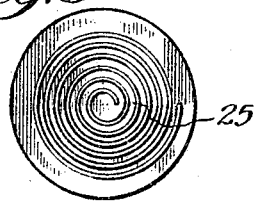
Inventors
Alan E. Vosburg
Robert B. Whitney
by _____ Attys Patented July 8, 1924.

1,500,691

UNITED STATES PATENT OFFICE.

ALAN E. VOSBURG AND ROBERT B. WHITNEY, OF DETROIT, MICHIGAN, ASSIGNORS TO ARTHUR V. HANNIFIN, OF CHICAGO, ILLINOIS.

BORING BAR AND THE LIKE.

Application filed February 6, 1922. Serial No. 534,622.

*To all whom it may concern:*

Be it known that we, ALAN E. VOSBURG and ROBERT B. WHITNEY, both citizens of the United States, and both residing at Detroit, in the county of Wayne and State of Michigan, have invented certain new and useful Improvements in Boring Bars and the like, of which the following is a specification.

This invention has to do with improvements in boring bars and the like. It has reference particularly to certain improvements in the construction of the means for securing the cutting tools adjustably in position within the boring bar, and also has to do with the provision of an improved means for adjusting the position of the cutting tools with respect to the boring bar.

In connection with the means for securing the cutting tools in place, one object is to provide a very simple construction, but a construction which will secure the cutting tools with great rigidity and firmness.

In connection with the feature of adjustability of the cutting tools with respect to the boring bar, one object is to provide an arrangement whereby the position of the cutting tools may be very accurately adjusted in combination with means for locking the tools with great rigidity with respect to each other during the working operation.

Another object of the invention is to provide a boring bar construction such that the cutters may be adjusted for a very broad expansion. In this connection, another object is to make provision for very rigidly supporting the cutting tools within the tool blocks in any position of adjustment.

Another object of the invention is to provide a construction of boring bar such that different tool blocks and different sets of tools may be interchangeably used therein for different classes of work so that rough boring or finish boring and reaming may be accomplished by the same boring bar by merely substituting different cutting tool blocks. In this connection, another object is to provide a construction such that the cutting tools themselves may be initially set into a removable block within which they are adjusted and secured, which block, including the cutting tools, may then be inserted into the boring bar proper to which it is then secured. In this connection another object is to make provision for very readily securing such removable tool block in place within the boring bar, to provide a construction such that said tool block may be very readily inserted into or removed from the boring bar, and to provide a construction such that said tool block when inserted into the boring bar may be supported on a three point suspension so as to insure accurate alignment of the cutting tools with respect to the boring bar.

Still another object in connection with the foregoing is to provide a boring bar construction such that it may be used in conjunction with removable tool blocks of different sizes, and such that it may from time to time be readjusted to accommodate these different sizes of blocks, and such that when so adjusted for any given size of block, it may be sealed against tampering by unauthorized persons.

Other objects and uses of the invention will appear from a detailed description of the same, which consists in the features of construction and combination of parts hereinafter described and claimed.

Referring to the drawings:

Figure 1 shows a longitudinal fragmentary section of a boring bar embodying the features of the present invention, portions of said boring bar being cut away so as to reveal the interior construction of the same;

Fig. 2 shows a view at right angles to that of Fig. 1;

Fig. 3 shows a section taken on the line 3—3 of Figs. 1 and 2, looking in the direction of the arrows;

Fig. 4 shows a side view of the locking pin;

Fig. 5 shows an end view corresponding to Fig. 4;

Fig. 6 shows a face view of the tool locking plate;

Fig. 7 shows an end view corresponding to Fig. 6; and

Fig. 8 shows a bottom face view of the scroll plate.

The boring bar proper is designated in the several figures by the numeral 10. It is provided with the transverse slot 11. Within this slot there may be seated a removable tool block 12, which tool block in itself is so constructed to receive and accommodate the tools and lock them securely in position with respect to each other under the desired adjustment or gauge. This tool block 12 is inwardly slotted and has the transverse connecting member or shoulder 13 at one side against which bear the front edges of the two cutting tools 14 and 15. These cutting tools are of the form illustrated in Fig. 3, having the overlapping inner end portions 16 and 17 respectively. These overlapping portions make it possible to secure a wide range of adjustment of the cutting tools with respect to each other while allowing a maximum amount of supporting and bearing surface for the tools themselves.

A lock plate 18 is located within the open side of the slot of the tool block 12 or constitutes a portion thereof. In the construction illustrated this locking plate 18 is secured in place within the tool block by pins or screws passing through the perforations 19 of the locking plate and the tool block. The front portion of the locking plate itself is partially slotted at its opposite sides as shown by the slots 20 in Fig. 6, these partially slotted portions being joined to the body portion of the locking plate by means of the central web 21. The fins 22 thus established on the locking plate may be deflected a slight amount by an expansive force operating within the slots 20. Such expansive force is provided by means of locking screws 23 as shown in Figs. 1 and 2 in particular. These locking screws are either tapered or the slots 20 are tapered, or both are tapered, so that upon turning the screws in the proper direction a wedging action is produced which causes the fins 22 to be deflected outwardly under heavy pressure to lock the tools in place within the tool block. The tools 14 and 15 may thus be very rigidly secured within the block 12.

When the screws 23 have been released the tools may be set in or out for the purpose of adjusting the gauge or diameter at which the boring bar will operate. Such adjustment may be secured in any convenient manner, but the arrangement illustrated is a very convenient one for this purpose. Said arrangement includes a circular " scroll plate " 24 seated within the tool block 12 in such manner that it can be rotated. Said circular scroll plate has on its bottom face a spiral groove 25 which engages with ribs or projections 26 on the faces of the tools 14 and 15 respectively. Owing to the spiral nature of the groove 25 of the scroll plate, the tools will be moved towards or away from each other through equal distances by simply turning the scroll plate. This scroll plate may be provided with a series of gauge marks 26ª calibrated to indicate the amounts of movement of the tools occasioned by the rotation of the scroll plate, so as to facilitate the initial setting of the tools without having to actually gauge them.

The tool block, together with the means for adjusting the gauge of the tools and the means for locking the tools in such adjusted position, constitutes a self-contained unitary device to the extent that the tools may be set into it and brought to the desired adjustment of gauge or diameter and locked in such adjustment before being inserted as a pair into the boring bar itself.

The boring bar itself is so constructed that the tool block, together with its tools may be readily inserted into it and then securely locked in position within the boring bar. This construction is as follows:

On one side the boring bar slot 11 receives an abutment block 27 having the wings 28 and 29 which embrace between them the lug 30 at the end of the slot. Screws 31 and 32 are provided for setting the abutment block 27 back and forth into the correct position within the boring bar and for securing said block rigidly in such position. Said screws may then be sealed to prevent tampering with them.

The abutment block 27 is provided with the side shoulders 33 and 34, and the tool block 12 is provided with an end recess having the fingers 35 and 36 which are adapted to wedge against the shoulders 33 and 34 in the manner which will be readily understood from examination of Fig. 1. The arrangement is such that the tool block itself may find a two point support against the abutment block 27, thus permitting the tool block to seat in the exact manner and position naturally determined by the position of the abutment block 27 as previously established by means of the screws 31 and 32.

The other end of the tool block 12 is provided with a curved recess 37. A locking pin 38 is extended through a transverse opening in the boring bar itself. This locking pin 38 has a relatively small inner end 39 which seats in an opening 40 of the boring bar, and has the relatively large outer end 41 which is screw threaded and threads into an enlarged socket 42 of the boring bar. The central portion 43 of the locking pin 38 is tapered as shown in Fig. 4, said tapered portion engaging the recess 37 of the tool block. Consequently, as the locking pin 38 is drawn home by turning it, a very powerful wedging action will be created against the notch in the end of the tool block. The tool block will thus be supported at a third point and under pressure determined by the locking pin.

The locking pin 38 is mutilated in its central portion at 44 so that when this mutilated portion is brought into registry with the tool block, the latter may be withdrawn from the boring bar without the necessity of entirely withdrawing the pin 38 itself.

It is to be observed that the slot 11 in the boring bar is illustrated as being of larger size than the tool block 12, the abutment plate 27 at one end of the slot 11 occupying the remaining space. By substituting abutment plates 27 of different sizes, it becomes possible to use tool blocks of different sizes in the same boring bar.

It is observed that tool blocks 12 of the same size may be kept in stock, each, however, carrying tools of different shape or size, which tool blocks, together with their tools, may be substituted from time to time without the necessity of changing the abutment plate 27.

It is also observed that as far as certain features of the present invention are concerned, the abutment plate 27 might be entirely eliminated, the tool block bearing directly against the end of the slot 11 of the boring bar; and furthermore in many cases the three point suspension feature may also be dispensed with, the tool block filling the slot 11 solidly or substantially so.

While we have herein shown and described only a single embodiment of the features of our present invention, still we do not limit ourselves to this embodiment except as we may do so in the claims.

We claim:

1. In a boring bar the combination of a bar having a transverse slot, an abutment block seated in one end of said slot and provided with two points of abutment separated from each other transversely of the bar, means for adjusting and securing the abutment block transversely of the bar, a tool block seated within the transverse slot aforesaid and having two supporting points adapted to engage the supporting points of the abutment block, a pair of cutting tools within the tool block and projecting therefrom, means for adjusting the amount of projection of said tools with respect to the tool block, means for securing the tools within the tool block, there being a perforation extending transversely of the bar at right angles to the slot aforesaid, a wedge pin extending through said perforation and having a wedging shoulder adapted to engage the front end of the tool block, means for compelling said shoulder to wedge against the tool block to thereby establish a third point of support for the tool block, and there being a mutilation notch in the pin for the purpose specified, substantially as described.

2. In a boring bar the combination of a bar having a transverse slot, an abutment block seated in one end of said slot and provided with two points of abutment separated from each other transversely of the bar, means for adjusting and securing the abutment block transversely of the bar, a tool block seated within the transverse slot aforesaid and having two supporting points adapted to engage the supporting points of the abutment block, a pair of cutting tools within the tool block and projecting therefrom, means for adjusting the amount of projection of said tools with respect to the tool block, means for securing the tools within the tool block, there being a perforation extending transversely of the bar at right angles to the slot aforesaid, a wedge pin extending through said perforation and having a wedging shoulder adapted to engage the front end of the tool block, and means for compelling said shoulder to wedge against the tool block to thereby establish a third point of support, for the tool block, substantially as described.

3. In a boring bar the combination of a bar having a transverse slot, an abutment block seated in one end of said slot, and provided with two points of abutment separated from each other transversely of the bar, means for adjusting and securing the abutment block transversely of the slot, a tool block seated within the transverse slot aforesaid and having two supporting points adapted to engage the supporting points of the abutment block, a cutting tool within the tool block and projecting therefrom, means for adjusting the amount of projection of said tool with respect to the tool block, means for securing the tool within the tool block, and means for engaging the front end of the tool block at a single point in wedging fashion to thereby establish a third point of support for the tool block, substantially as described.

4. In a boring bar the combination of a bar having a transverse slot, an abutment block seated in one end of said slot and provided with two points of abutment separated from each other transversely of the bar, means for adjusting and securing the abutment block transversely of the bar, a tool block seated within the transverse slot aforesaid and having two supporting points adapted to engage the supporting points of the abutment block, a cutting tool within the tool block and projecting therefrom, and means for engaging the tool block at a single point in its front end in wedging fashion to thereby establish a third point of support for the tool block, substantially as described.

5. In a boring bar the combination of a bar having a transverse slot, an abutment block seated in one end of said slot and provided with two points of abutment separated from each other transversely of the bar, a tool block seated within the transverse slot aforesaid and having two supporting points adapted to engage the supporting points of the abutment blocks, a cutting tool within the tool block projecting therefrom, and a wedge block extending across the front portion of the slot and adapted to adjustably engage the front portion of the tool block at a single point to thereby establish a third point of support for the tool block, substantially as described.

6. In a boring bar the combination of a bar having a transverse slot, a tool block adapted to seat therein, a pair of cutting tools in the tool block, means for moving said cutting tools with respect to each other, a split locking plate within the tool block and in contact with the tools, and means for spreading the split to effect a clamping thereof, and means for removably securing the tool block within the slot of the bar, substantially as described.

7. In a boring bar the combination of a bar having a transverse slot, a tool block therein, a pair of cutting tools within the tool block, a transverse locking plate engaging said tools, and means associated with said locking plate for clamping said tools rigidly within the tool block, and means for removably securing the tool block within the slot of the bar, substantially as described.

ALAN E. VOSBURG.
ROBERT B. WHITNEY.